(12) United States Patent
Saeed et al.

(10) Patent No.: US 7,289,189 B2
(45) Date of Patent: Oct. 30, 2007

(54) BIREFRINGENT FILTER-BASED COLOR GENERATION SCHEME FOR A PASSIVE MATRIX DISPLAY DEVICE

(75) Inventors: Salman Saeed, Tempe, AZ (US); Philip Bos, Hudson, OH (US)

(73) Assignee: Kent State University, Kent, OH (US)

( * ) Notice: Subject to any disclaimer, the term of this patent is extended or adjusted under 35 U.S.C. 154(b) by 235 days.

(21) Appl. No.: 10/479,354

(22) PCT Filed: May 31, 2002

(86) PCT No.: PCT/US02/17073

§ 371 (c)(1),
(2), (4) Date: Jul. 2, 2004

(87) PCT Pub. No.: WO02/099516

PCT Pub. Date: Dec. 12, 2002

(65) Prior Publication Data

US 2004/0239870 A1    Dec. 2, 2004

(51) Int. Cl.
*G02F 1/13*     (2006.01)
*G02F 1/1335*   (2006.01)

(52) U.S. Cl. .................. 349/194; 349/117; 349/193

(58) Field of Classification Search ................ 349/96, 349/117–119, 9, 18, 97, 200, 193–194
See application file for complete search history.

(56) References Cited

U.S. PATENT DOCUMENTS 5,929,946 A * 7/1999 Sharp et al. ................. 349/18
6,417,892 B1 * 7/2002 Sharp et al. ................. 348/742

* cited by examiner

*Primary Examiner*—Dung T. Nguyen
(74) *Attorney, Agent, or Firm*—Fay Sharpe LLP (57) ABSTRACT

The present invention provides a full color liquid crystal display of passive matrix design that includes a polarizer, an analyzer having a transmission axis, and at least one light generation stage positioned between the polarizer and analyzer for transmitting light of a desired wavelength to the analyzer. This light generation stage includes a first retarder stack that rotates desired wavelengths of light to a particular polarization state, a second retarder stack inverted and rotated by 90 degrees with respect to said first retarder stack, and a passive matrix addressed optical element positioned between the first and second retarder stacks. The retardation and orientation of each of the first retarder stack, second retarder stack, and passive matrix addressed optical element are optimized so as to provide a color generation stage that places desired wavelengths of light substantially along the transmission axis of the analyzer.

13 Claims, 7 Drawing Sheets

FIG. 1

(Prior Art)

BIREFRINGENT FILTER-BASED COLOR GENERATION SCHEME FOR A PASSIVE MATRIX DISPLAY DEVICE

BACKGROUND ART

The present invention generally relates to full color liquid crystal displays generated by the use of birefringent filters. More particularly, the present invention relates to full color liquid crystal displays using polarization interference filters in a passive matrix addressing scheme.

Traditionally color generation in liquid crystal displays (LCD) is accomplished by the patterning of color filters onto individual pixels. However, the use of color filters results in both a loss of resolution, due to subpixeling, and lower light transmission, due to the absorptive nature of the filters. Other methods of generating color include field sequential color in which the actual color is generated by RGB light emitting diodes (LED) and the liquid crystal (LC) pixel is driven so as to either block or transmit the colored light. This typically requires the LC to be driven at a very high frame rate which in turn calls for a very fast switching LC material and mode. Such materials and modes are difficult to find.

Another method of color generation employs polarization interference filters (PIF). Such filters work by introducing a phase shift between two orthogonally polarized field components by either a static or dynamic optical element such as a uniaxial retarder or electrically driven LC cell. Color is generated by the interference of these two components with an analyzer, and color switching is accomplished by changing the phase shift between the two components by using dynamic optical elements. Since there is no more absorption than the losses associated with polarizer absorption, the PIF can generate color with a higher luminance than absorptive color filters.

The use of retarders between polarizers to function as filters has been studied for several years, starting with the original design for monochromatic imaging by French astronomer Lyot. See I. J. Hodgkinson, Q. H. Wu: *Birefringent Thin Films and Polarizing Elements,* (World Scientific Press, Singapore 1997) $1^{st}$ ed., Chap. 4, p. 52, incorporated herein by reference. The Lyot filter design was improved upon by the Solc design, which offered similar filtering characteristics but higher overall transmission. This design is generally disclosed in Ivan Solc, Czechoslovak Journal of Physics, Vol. 10(1), 16-34 (1960), also incorporated herein by reference. The Solc design was then generalized by Harris et al., A Optical Network Synthesis Using Birefringent Crystals, 1. Synthesis of lossless Networks of Equal-Length Crystals, J. Opt Soc. America (1964) 54(10):1267-1279, incorporated herein, describing a synthesis procedure for obtaining various filter designs.

The two original Solc designs are the "fan" and "folded" type. In the fan design, the wavelengths at which the elements have an even number of half waves of retardation pass through an output polarizer oriented parallel to the input polarizer. In the folded design, the wavelengths at which the elements have an odd number of half waves of retardation pass through the output polarizer, which is crossed with respect to the input polarizer. The passband characteristics of the Solc filters are directly related to the number of elements used to create the filter, i.e., the larger the number of elements, the sharper the passband. Another crucial element in the transmission function is the size and frequency of the sidelobes. The Solc filters, as it turns out, are not optimal in design and give passband sidelobes that can be avoided using various synthesis techniques.

The use of PIFs for the generation of color in a display device was shown by Sharp et al., U.S. Pat. No. 5,929,946. Starting from a Solc filter design, the design of a device capable of switching between a single desired color and black or white, depending upon polarizer orientations, was shown. Given that a folded Solc filter will filter the desired wavelengths by rotating them by pi/2, a second active optical element was added to the filter in order to be able to switch between a filtering and non-filtering action. Particularly, a single, switchable half wave plate was placed between the filter and the second half of the filter was repositioned. Proper repositioning required inverting the second half of the filter and rotating it by pi/2, as shown in FIG. 1, and discussed below.

Figure 1:
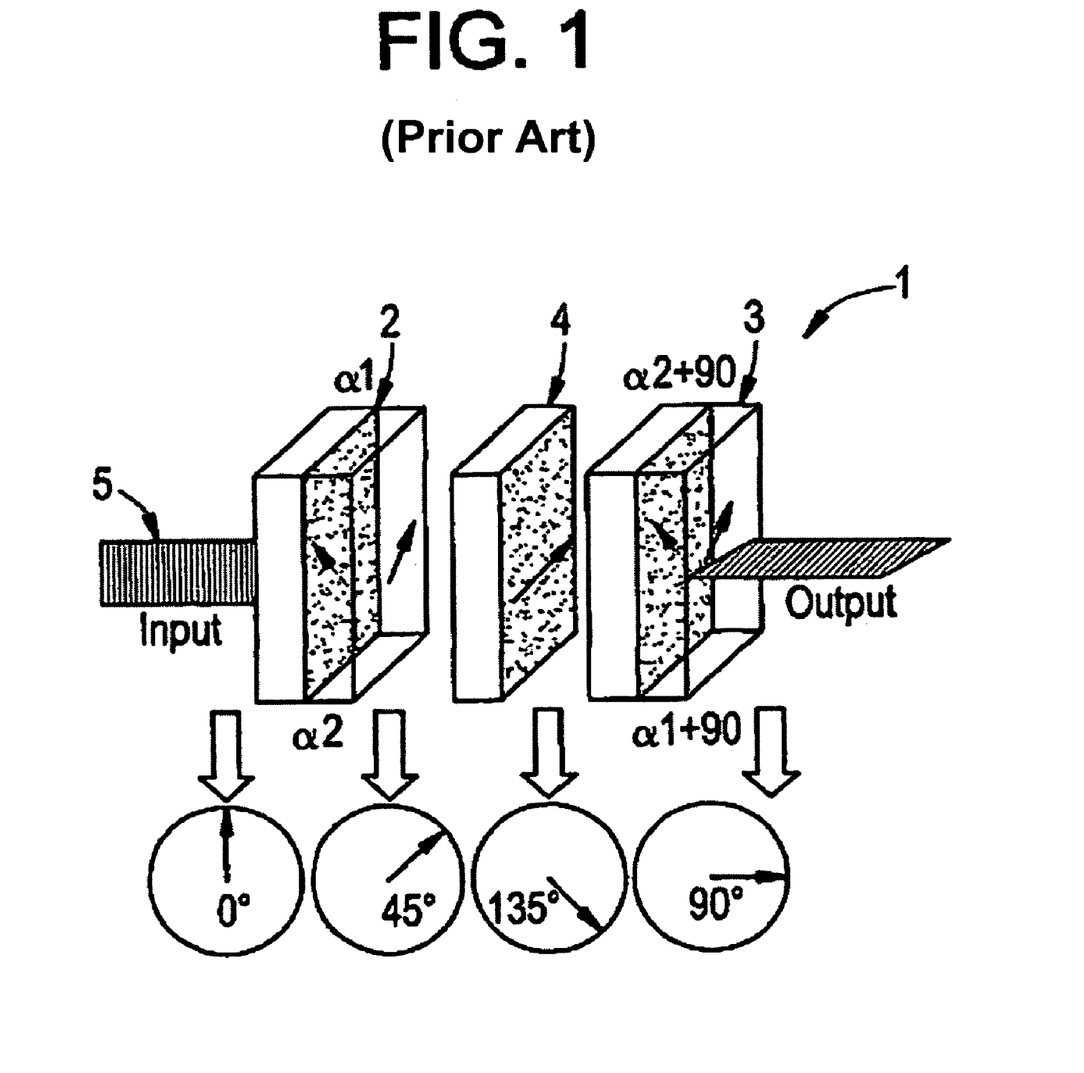
FIG. 1 is a representation of a prior art folded Solc filter based design having four retarders split by an active liquid crystal cell with uniform optic axis orientation of 90°, wherein the arrows inside the retarders and liquid crystal cell show the orientation of the optic axis of the retarders and liquid crystal, and the arrows within the circles show the polarization factor of the desired wavelength.

With reference to FIG. 1, a single color generation stage of a display device according to Sharp is designated generally by the numeral 1. Color generation stage 1 includes a first retarder stack 2 (pre filter), a second retarder stack 3 (post filter), which is inverted and rotated by 90° with respect to first retarder stack 2, and an active matrix addressed optical element 4 (liquid crystal cell), particularly, a half wave plate, placed between first and second retarder stacks 2,3. First retarder stack 2 is oriented to rotate a desired wave length of light to an angle of pi/4, with respect to the optic axis of the active matrix addressed optical element 4 (half wave plate). As is generally known, crossed or parallel polarizers (not shown), particularly an input polarizer and an output analyzer, are employed to introduce polarized light to the color generation stage 1 and to analyze the light transmitted through color generation stage 1.

If LC cell 4 is switched so that its net retardation is zero, then the first part of the filter, first retarder stack 2, is crossed with respect to the second part of the filter, second retarder stack 3, as shown in FIG. 1. In this case, the net retardation between the two polarizers is zero and so the display appears black for crossed polarizers and white for parallel polarizers. If LC cell 4 is switched so that it is a half wave plate, then its effect on the filter depends on its orientation in the stack. Given that a folded Solc design rotates the desired wavelength by pi/2, then half the filter will rotate it by pi/4. As shown in FIG. 1, light 5 entering the filter from the left will have the desired wavelength rotated by pi/4 while light entering from the right will be rotated by -pi/4 to 3pi/4. Therefore, for light 5 to pass through the complete filter, LC cell 4 must take light polarized at pi/4 and rotate it to 3pi/4 degrees. A pi/2 rotation is easily accomplished by placing LC cell 4 at pi/4 to the incoming polarization. In this position the LC cell allows the filter to be switched on or off depending on its own state. For intermediate voltages, LC cell 4 acts as a retarder between 0 and pi/2 and so rotates the incoming linearly polarized light to some elliptical state. As a result, the desired wavelength is not completely rotated by the second half of the filter and so suffers absorptive losses at the analyzer. In this manner, intermediate grey scale colors can be created.

The effect of the filter on the rest of the spectra is as follows. In the case of a pure folded Solc filter, the undesired wavelengths entering the filter linearly polarized at 0° are all left unrotated (more so for a multiple plate retarder than a two plate) and are absorbed at the analyzer, which is crossed with respect to the polarizer. For the above design, the placement of the LC cell ensures that the unwanted spectra remains unaffected. While the desired wavelength is rotated, by the first part of the filter, to pi/4, the rest of the spectra remains at 0°. Thus, the undesired wavelengths are at pi/2 to the LC cell optics axis and the LC cell has no effect on them.

Passing through the second half of the filter, they remain linearly polarized at 0° and are absorbed by the analyzer.

Therefore, in summary, Sharp design requires the following:
(1) a polarizer providing linearly polarized white light at a known orientation;
(2) a prefilter to rotate desired wavelengths to an angle of pi/4 with respect to the optic axis of the LC cell (or other electro- or magneto-optic modulator) while leaving undesired wavelengths untouched;
(3) an active matrix addressed optical element such as a LC cell (or other electro- or magneto-optic modulator) that rotates linearly polarized light by pi/2, i.e., a half wave plate, and has no effect on light polarized along or orthogonal to its optic axis; and
(4) a postfilter that is a copy of the prefilter except inverted and rotated by pi/2.

Figure 2:
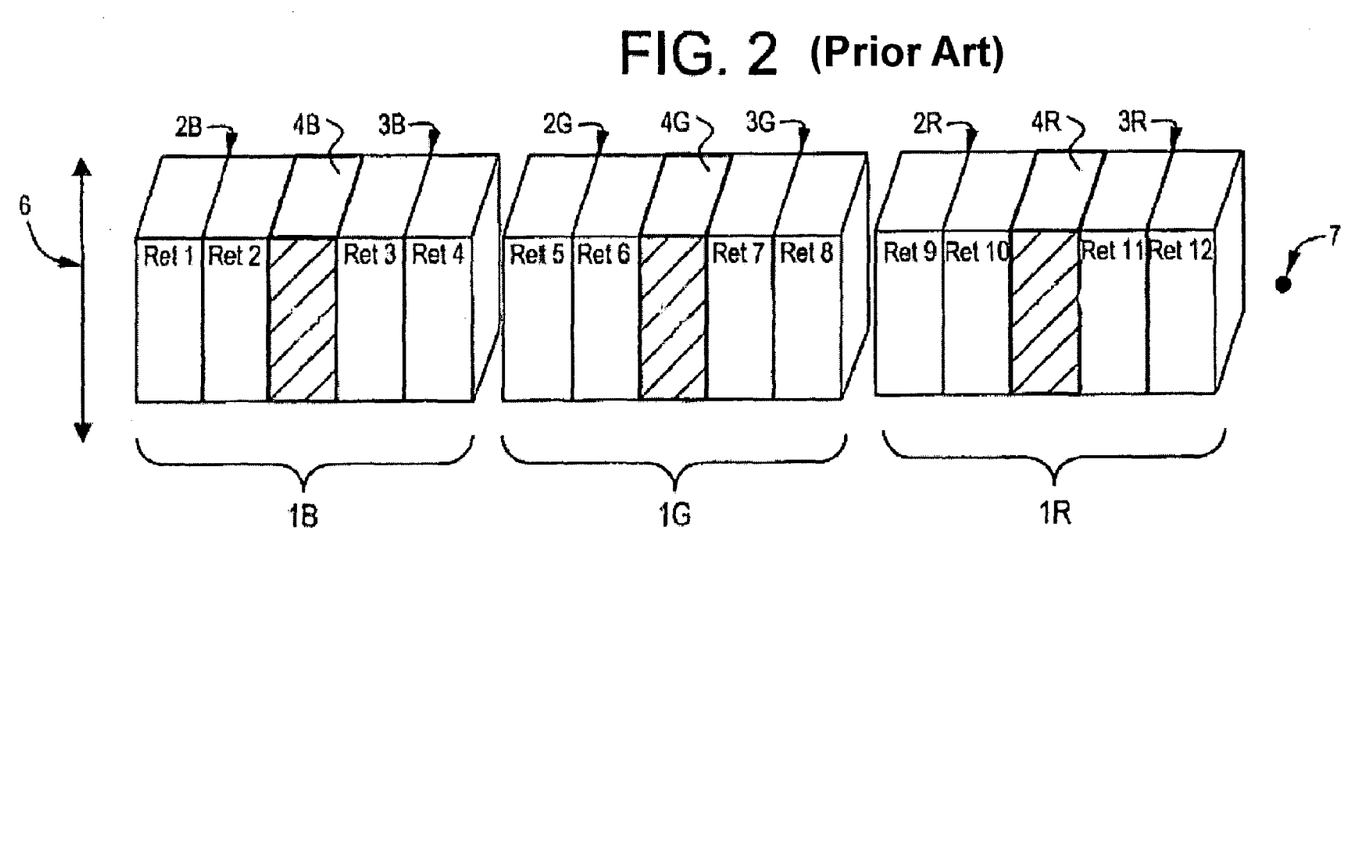
FIG. 2 depicts a prior art full color liquid crystal display of a stacked filter design, employing active matrix addressed optical elements 4B, 4G, 4R, in three color generation stages 1B, 1G, 1R.
Figure 3A:
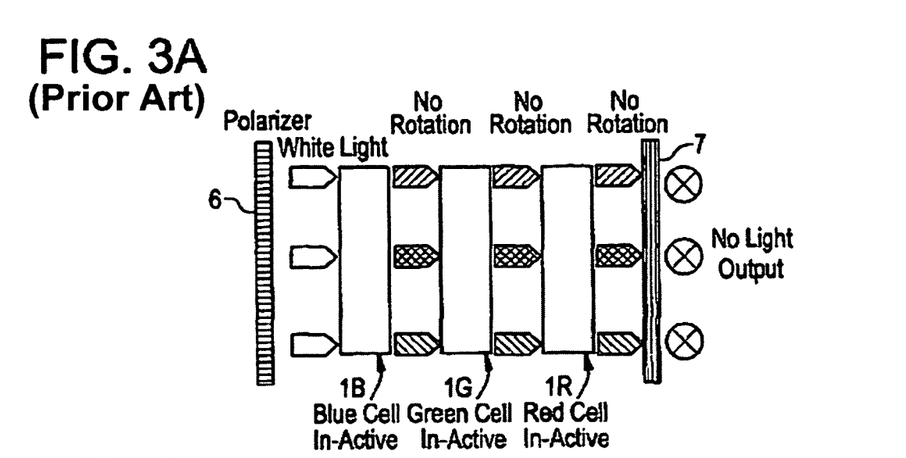
FIG. 3 is a representative diagram of polarized light passing through three different stacks of filters (stacks (A), (B), (C)), wherein each stack contains three filters individually tuned for blue, green, and red wavelengths.
Figure 3B:
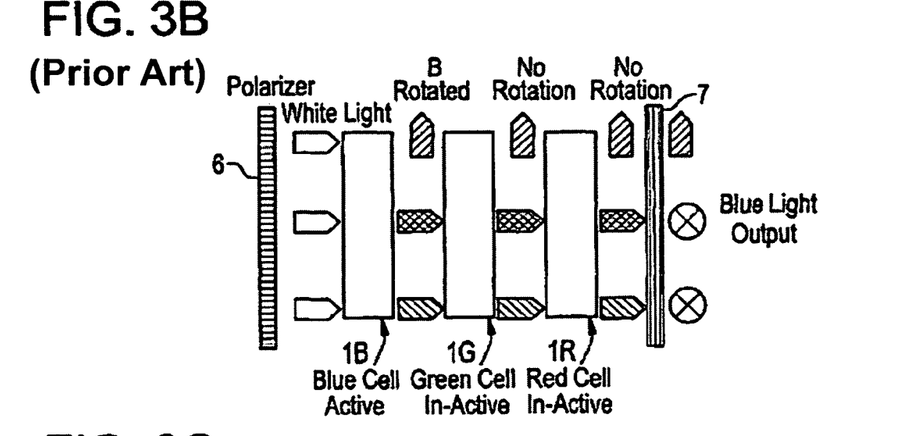
Figure 3C:
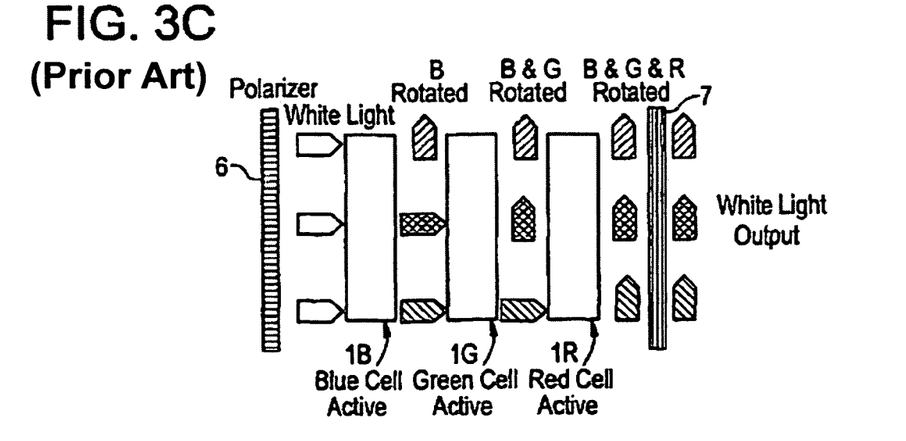

Such a filter design is capable of producing a relatively narrow passband transmission function (depending on the number of retarders making up the pre and post filter) and so can produce a single color or its grey scales from input white light. Such a filter is discussed in S. Saeed, P. J. Bos, Z. Li, SID00 Digest, 830 (2000), incorporated herein by reference. In order to produce more than one color, i.e., red, green, and blue, a stacked approach is taken to provide a full color liquid crystal display, as shown in FIGS. 2 and 3. In the stacked approach, a color generation stage according to FIG. 1 is tuned for each of the three primary colors (designated as 1B, 1G, and 1R) and then stacked one on top of the other. In FIG. 2, like parts as compared to FIG. 1 have received like numerals, with distinctions made between each stage and its elements by employing the letters B, G, and R to indicate blue, green, and red. Only one polarizer 6 and analyzer 7 is used at the two ends, and, in FIGS. 2 and 3, they have transmission axes that are orthogonal to one another, although parallel configuration may alternately be practiced. The stacked design works since each stack only rotates the wavelengths associated with its color, eg., the blue stack is designed to rotate wavelengths 430 nm to 490 nm while the rest of the spectra is left linearly polarized at 0°. Since the analyzer is placed at the end of the stack, this part of the spectra is able to move through the other two stacks, as shown in FIG. 3(B).

In FIG. 3, white polarized light is shown passing through three different stacks of filters, each stack containing three filters individually tuned for red (1R), green (1G), and blue (1B) wavelengths. At (A), the filters are all in an optically inactive mode, and the entire spectrum is blocked by the crossed polarizers. At (B), the blue filter is in an optically active mode, such that the blue spectrum is rotated and the stack ultimately outputs blue light. At (C), all three of the filters, blue (1B), green (1G), and red (1R), are in an optically active mode, and, thus, all three parts of the spectrum, blue, green, and red, are rotated, and the stack ultimately outputs white light.

Since the entire white light spectra is able to move through the three layer stack with each layer only affecting selected wavelengths, the stack can produce red, green, blue and white light or any combination thereof. This however will only be true if the red, green, and blue spectra do not overlap. As mentioned before, the bandwidth of each filter depends on the number of elements making up the filter. If only four retarders are used, for example, then the filter's bandwidth will be quite broad. If this filter was to be placed in the stacked design, it would rotate parts of the undesired spectra along with the desired spectra. For example, if the red filter is broadband, then it will rotate parts of the green spectra also. As a result, if the stack is setup to be in the white state, i.e., all three layers are rotating their selected wavelengths, then the green would be over rotated, and the resulting white output would lack some green. Therefore, in a stack design, it is important to have each filter's bandpass be as narrow as possible so as to prevent the overlap that reduces efficiency.

There are a number of orientations that the retarders making up the filter can have and still provide similar if not identical transfer functions. Synthesis techniques described by Harris et al., cited above, and Buhrer, Appl. Opt. 33, 2249-2254 (1994), are useful for obtaining the best orientations of the filter elements for a required transfer function, and each reference cited is incorporated herein. These synthesis techniques rely on the fact that each element in the filter provides one cosine Fourier component of the desired transmission function. Such synthesis techniques are useful in situations where the active element in the filter operates in the 0 to pi/2 range.

A birefringent filter based LCD employing electrically controlled birefringence (ECB) type cells, which fall into the category of optically simple active elements, was disclosed in the above-referenced Saeed et al. publication. The ECB type cells, however, require a rather expensive drive method called active matrix addressing, which involves the use of a transistor at each pixel edge to provide a switching operation.

A less expensive drive method is passive matrix addressing. A passive matrix addressing design could make use of the electro-optical characteristics of the LC mode and could drive displays without the use of transistors, and, as a result, the display would be cheaper and easier to manufacture. However, the requirement of a sharp electro-optical curve means that LC modes such as the ECB cannot be used in conjunction with passive matrix addressing. Thus, there exists a need in the art for a birefringent filter-based color generation scheme for a passive matrix display device.

In the design of a single stage of a color filter, the incident light can be considered to have two spectral components: a controlled spectral component and an un-controlled spectral component.

One of the required features of the electro-optical element in the color filter of Sharp is that the polarization state of the controlled spectral component of the light is effected by the state of the electro-optical element, but the polarization state of the uncontrolled component is not.

Sharp used an untwisted liquid crystal device for which it is well known that if light is linearly polarized with a particular state (at 45° to the projection of the optic axis on the plane of the device), that the polarization state of the light will be affected by a voltage applied to the device; but if light is polarized parallel to the projection of the optic axis, then the polarization state will not be affected by a voltage applied to the device.

However, untwisted nematic devices typically do not show that appropriate voltage versus polarization state change that is required for a multiplexed passive matrix display, and it is not clear, from Sharp, that it could be possible to use a nematic material of twisted structure. In fact, it is well known that twisted devices do not have the characteristic that a state of linearly polarized light with a wide wavelength spectral band can be unaffected by the state of the device. Therefore, the problem of designing a filter of the type discussed by Sharp, but having a twisted, multiplexable, liquid crystal device, is the focus of this invention.

SUMMARY OF THE INVENTION

In general, the present invention provides a color liquid crystal display of passive matrix design that includes a polarizer, an analyzer having a transmission axis, and at least one light generation stage positioned between the polarizer and analyzer for transmitting light of controlled wavelengths to the analyzer. This light generation stage includes a first retarder stack that rotates controlled wavelengths of light to a particular polarization state, a second retarder stack inverted and rotated by 90 degrees with respect to said first retarder stack, and a passive matrix addressed optical element including a first twisted liquid crystal cell and a compensator, the element positioned between the first and second retarder stacks, wherein the compensator ideally cancels the optical effect of the first twisted liquid crystal cell when the first twisted liquid crystal cell is in a first state, and wherein the compensator does not cancel the optical effect of the first twisted liquid crystal cell when the first twisted liquid crystal cell is not in the first state. The retardation and orientation of the first retarder stack, the second retarder stack, and the first twisted liquid crystal cell are optimized so as to provide a color generation stage that, according to the state that the first twisted liquid crystal cell is in, selectively causes the controlled wavelengths of light to be polarized along the transmission axis of the analyzer, while not effecting the polarization state of uncontrolled wavelengths.

In particular embodiments, the compensator is selected from the group consisting of (a) a second twisted liquid crystal cell, fixed in one of the states of said first twisted liquid crystal cell and having an opposite twist sense, and (b) a birefringent film composite constructed to cancel the optical effect of said first twisted liquid crystal cell in one of its states.

A specific embodiment of the present invention provides a full color liquid crystal display of passive matrix design that includes a polarizer, a red light generation stage, a green light generation stage, a blue light generation stage, and an analyzer having a transmission axis. The red light generation stage includes a first red stage retarder stack that rotates red wavelengths of light to a particular polarization state, a second red stage retarder stack inverted and rotated by 90° with respect to the first red stage retarder stack, and a red stage passive matrix addressed optical element positioned between the first and second red stage retarder stacks, wherein the retardation and orientation of each of the first red stage retarder stack, the second red stage retarder stack, and the red stage passive matrix addressed optical element are optimized so as to provide a red light generation stage that places red light wavelengths substantially along the transmission axis of the analyzer while having no effect on the other wavelengths of light passing therethrough. The green light generation stage includes a first green stage retarder stack that rotates green wavelengths of light to a particular polarization state, a second green stage retarder stack inverted and rotated by 90° with respect to the first green stage retarder stack, and a green stage passive matrix addressed optical element positioned between the first and second green stage retarder stacks, wherein the retardation and orientation of each of the first green stage retarder stack, the second green stage retarder stack, and the green stage passive matrix addressed optical element are optimized so as to provide a green light generation stage that places green light wavelengths substantially along the transmission axis of the analyzer while having no effect on the other wavelengths of light passing therethrough. The blue light generation stage includes a first blue stage retarder stack that rotates green wavelengths of light to a particular polarization state, a second blue stage retarder stack inverted and rotated by 90° with respect to the first blue stage retarder stack, and a blue stage passive matrix addressed optical element positioned between the first and second blue stage retarder stacks, wherein the retardation and orientation of each of the first blue stage retarder stack, the second blue stage retarder stack, and the blue stage passive matrix addressed optical element are optimized so as to provide a blue light generation stage that places blue light wavelengths substantially along the transmission axis of the analyzer while having no effect on the other wavelengths of light passing therethrough In this embodiment, polarized light is input to one of the red, green, or blue light generation stages, and passes through each of the stages before being input to the analyzer. Because each stage places its own primary color (red, blue, or green) along the transmission axis of the analyzer, while having no effect on the other wavelengths of light passing therethrough, virtually any color can be emitted from the analyzer.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

PREFERRED EMBODIMENT FOR CARRYING OUT THE INVENTION

As mentioned, and discussed with respect to FIGS. 1-3, the prior art teaches that the generation of color in a display device employing polarization interference filters requires a polarizer, a prefilter retarder stack, an active matrix addressed optical element, such as a liquid crystal cell with transistors disposed at each pixel location, a post filter retarder stack, and an analyzer. Similar elements are employed in the present invention; however, whereas the optical element of the prior art requires the active matrix addressing drive method, the present invention operates through passive matrix addressing by employing a passive matrix addressing optical element.

Figure 4:
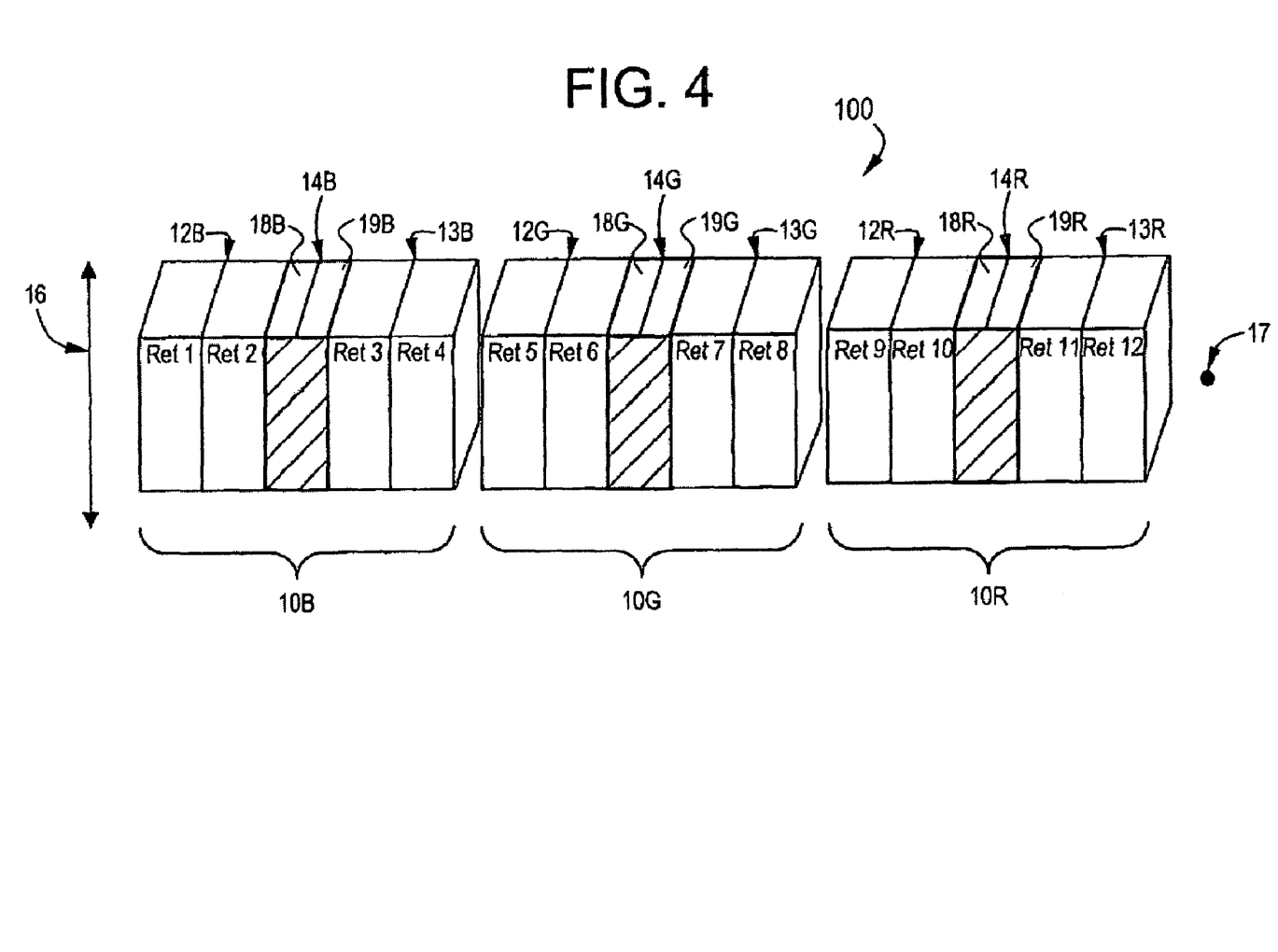
FIG. 4 depicts a full color liquid crystal display according to this invention, employing passive matrix addressed optical elements.

Thus, FIG. 4 depicts a full color liquid crystal display of passive matrix design, designated generally by the numeral 100. Similar to FIG. 2, display 100 includes a color generation stage for each primary color, blue, green, and red, designated as 10B, 10G, and 10R, respectively. Each stage 10 includes first retarder stack 12 and second retarder stack 13, which is inverted and rotated by 90° with respect to first retarder stack 12, with distinctions made between each stage and its elements by employing the letters B, G, and R to indicate blue, green, and red stages. Whereas the prior art employed active matrix addressed optical elements, the present invention employs passive matrix addressed optical elements 14. Particularly, the electrically controlled birefringence (ECB) cells employed in the prior art are herein replaced with a passive matrix addressed optical element including a twisted liquid crystal cell 18 and a compensator 19. A polarizer and analyzer are also employed at opposite ends of the stacked stages 10, and are respectively represented by arrow 16 and dot 17, which indicate the transmission axes of these elements. It will be appreciated that the present invention might be practice with either orthogonal or parallel polarizer/analyzer configurations, and, while the orthogonal configuration produces blue, green, and red spectras, as in FIG. 4, the parallel configuration would similarly produce yellow, magenta, and cyan spectras. In either case, the stacked configuration can produce any desired color. In the present invention, the orientation and retardation of each retarder and the passive matrix addressed optical element are reworked such that each light generating stage places desired wavelengths of light along the transmission axis of the analyzer, while having no effect on the other wavelengths of light passing therethrough.

The twisted LC cell has a relatively complex optical characteristic due to its highly twisted structure. It no longer acts as a waveguide, and its output polarization states are generally never linear in nature. As a result, the twisted LC cell cannot be substituted for the ECB cell in the filter designs of the prior art. Also, the fact that twisted LC cells have to be driven at two voltages, neither of which has an isotropic output, means that they cannot be used in the filter designed for an ECB. By having no isotropic output it is understood that no matter what orientation linearly input light has with respect to the twisted LC cells optic axis, the twisted LC cell will always have an effect on it. In a twisted LC cell, it is impossible to achieve the isotropic condition required to pass white light through unaffected, because the cell, in both voltage cases, is never at zero retardation. This is unlike the ECB cell case where light linearly polarized at 0° or pi/2 with respect to the optic axis passes through unchanged, and is a fundamental requirement for the filter design.

In the present invention, employing liquid crystals of twisted structure, in order to satisfy the requirement that in one state the passive matrix addressed optical element has a net zero retardation, a compensator is paired with the twisted LC to form the passive matrix addressed optical element. The twisted liquid crystal cell is a driven element to which differing voltages are applied to achieve a desired optical state, while the compensator is an inactive element selected from the group consisting of (a) a second twisted liquid crystal cell, fixed in one of the states of the first twisted liquid crystal cell and having an opposite twist sense, and (b) a birefringent film composite constructed to cancel the optical effect of the first twisted liquid crystal cell in one of its states.

When the compensator is selected from a second twisted LC cell and the first twisted LC cell is in the same state in which the second twisted LC cell (i.e., the compensator) is fixed, it serves to cancel the effect of the first twisted LC cell on the polarization state of light entering the passive matrix addressed optical element. When the first twisted LC cell is in a different state than that in which the compensator is fixed, the compensator does not cancel the effect of the first twisted LC cell on the polarization state of light, and a net optical effect is provided across the passive matrix addressed optical element.

When the compensator is selected from a birefringence film composite, the film is constructed to mock the characteristics of a second compensator twisted LC cell, as above. Thus, the film compensator is constructed to cancel the optical effect of the first twisted liquid crystal cell in one of its states. A DSTN cell is disclosed below as satisfying the second twisted LC cell compensator concept, but it should be understood that the computer modeling techniques employed to optimize the DSTN situation could be applied in optimizing a compensator film embodiment.

The passive matrix addressed optical element (twisted liquid crystal and compensator) can be satisfied with a double layer super twisted neumatic (DSTN) cell—in such a case, the compensator is a second twisted LC cell. The DSTN cell uses two STN cells. One cell can be driven, and has either a left or right handed twist, while the other cell is placed orthogonally with respect to the first, and has the opposite twist. As a result, when the first cell is in the non-select state, similar to the second, the two cancel each other out and appear optically isotropic, thereby satisfying one of the requirements. In the select state, the first cell is driven while the second is left as is, and the DSTN appears optically active. In the film-compensated situation, a film compensated super twisted nematic cell (FCSTN) could be constructed to satisfy the necessary twisted LC cell and compensator configuration.

The second requirement of having an orientation at which light input linearly polarized passes through unaffected is a lot harder to satisfy considering the DSTN cell and the complex optics of its driven and undriven state. This requirement has to be satisfied since only the desired wavelengths should be rotated, leaving the rest of the spectra untouched. If the DSTN was to rotate any other part of the spectra, then, in a stacked design, the successive filters would not have 100% of the spectra with which to work, and efficiency would be considerably lower and unwanted colors would leak.

Figure 5:
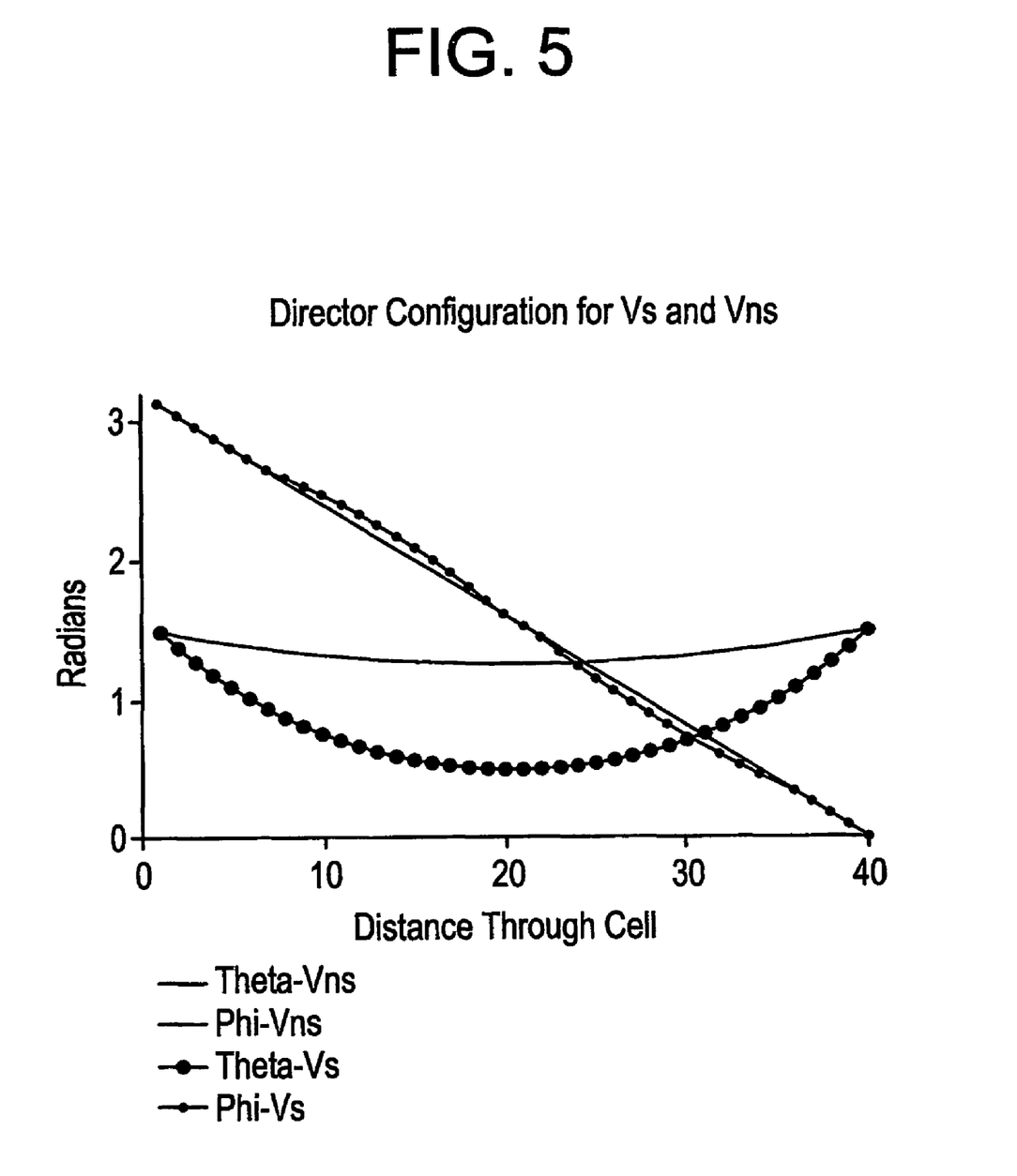
FIG. 5 is a graph representing the calculated director tilt and twist profiles at Vs and Vns for the STN liquid crystal employed according to Table 1.

In this invention, in order to obtain the best orientations and retarder values, computer modeling is employed to optimize a stack of color stages, as in FIG. 4. A four uniaxial retarder (2 pre, 2 post filters) and one passive matrix addressed optical element (DSTN) filter was chosen. The number of retarders used here is for the sake of example and ease of manufacturing. Any number of retarders could be used since the more retarders used the better the filter performance. The STN mode was chosen to be a 180° twist, with parameters given in Table 1, and director profiles at select and non select voltages shown in FIG. 5. It should be noted that the parameters of Table 1 have been chosen here for the sake of providing an example, and should not serve to limit the present invention. Indeed, it is believed that the twist of any twisted liquid crystal cell disclosed herein may have a twist anywhere between 90° to 270° and preferably between about 180° to about 220°. It will also be appreciated that the liquid crystal cells disclosed herein could be "bistable" devices. Bistable refers to the ability of the cell to be placed in a particular state or twist by some application of a physical property, typically an applied voltage, and wherein that state or twist remains indefinitely, after removal of the applied voltage of physical property, until a new voltage or property is applied.

TABLE 1

STN Parameters Used In The Modeling Process

| | |
|---|---|
| Twist | 180° |
| Thickness | 5 microns |
| Pretilt | 5° |
| Elastic constants | K11 = 10, K22 = 7, K33 = 18 |
| Dielectric constants | Eparr = 15, Eperp = 10 |
| Vs, Vns | 2.44, 2.10 |
| d/p | 0.5 |

The extended Jones matrix method was used to obtain the spectral output of the stack. A. Lien: Liquid Crystal 22 (1997) No. 2, 171. Even though obtaining the spectral response of a single configuration of the complete stack is a relatively fast operation on a computer, the sheer number of possible orientations of all the elements in the stack makes it impossible to model the entire R, G, and B filter stack put together. As a result, a single color generation stage was modeled between crossed polarizers (i.e. polarizer and analyzer). The retardations (R1, R2) and orientations (O1, O2) of the first two retarders (pre filter) in the stack were allowed to vary as well as the retardation of the LC (R3) used in the DSTN and the DSTN's orientation (O3). The last two retarders in the stack used the same retardances as the first two, except that they were inverted (R2,R1) as well as orthogonal (R2±pi/2,R1±pi/2) as required by the design. The orientation of the retarders was changed from −90° to 90° in steps of 15°, and their retardations changed from 20 nm to 200 nm in steps of 20 nm. The DSTN angle was changed from −90° to 90° in steps of 15°, and its retardation from 100 nm to 380 nm in steps of 20 nm. For each combination of the above, transmission values were calculated at four different wavelengths. For example, for the blue stack, light transmission is calculated at 430, 550, and 650 nm. In order for the blue filter to be optimized, the characteristics of the elements were written to file if the normalized transmission at 430 nm was greater than 0.5, at 550 nm was less than 0.125, and at 650 nm was less than 0.05. Only three points were used for the calculation in light of the time it takes for each calculation, based upon the sheer number of different combinations of retarder orientations and the computer resources available. The same was done for the green and red filter case with properly chosen wavelength points and threshold values. When the transmission for each filter satisfied the given thresholds, the retarder and DSTN characteristics were saved.

The outputs for the R, G, and B filter were then further refined. This was done by reading in the saved files obtained from the step above and moving the retarder around the given value, for example, plus or minus 5°. In this case the DSTN retardation was varied ±10 nm and its angle ±5° around the given value. Only the angular value of the retarder changed by the ±5°. For each possible combination, the transmission, at wavelengths similar to the above case, were calculated and compared to the same threshold. If the new orientations satisfied the threshold, they were written to the file. In this way a finer orientation was obtained around values that were known to work. This significantly reduced the computation time as compared to a situation in which the original search is done with the finer angular resolution.

In the next step, each of the configurations from above were read from file, and, for each configuration, the transmission at different wavelengths was calculated. In the case of the blue filter, for example, 550 nm, 600 nm, 650 nm, and 700 nm wavelength values were used. This was done to eliminate configurations that have significant leaks at those wavelengths, signifying that more than one maxima or a large sidelobe exists in the transmission function. Such a process will eliminate a number of configurations that are dissimilar to the desired transmission function.

The configurations that did satisfy the thresholds were written to the file for each filter. Next, these configurations were read from the file and further refined. In this step, only the retarder angles were refined, by allowing the angles to float ±5° from the ones read in from file and varied in steps of 0.25°. This was done to obtain the Solc defined angles for a filter using two retarders. The same threshold conditions as in the step above were applied and the configurations satisfying the threshold were written to file.

In order to rank the configurations obtained above for each filter, the CIE 1931 color coordinate for each configuration in the file was calculated. For each coordinate, its position with respect to the NTSC color coordinates was calculated. The configurations were then ranked from closest to furthest from the NTSC color coordinate for each filter. However, the proximity to the CIE color coordinate alone does not signify that the configuration is the best, since its overall luminance can be low. As a result, the first 100 configurations were analyzed, and the one with the brightest output was chosen.

Figure 6:
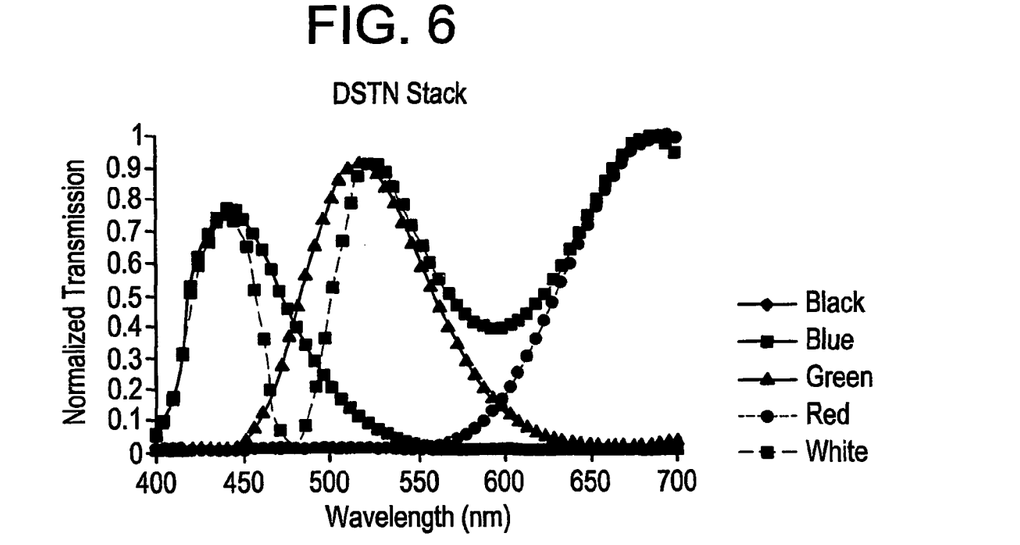
FIG. 6 shows the spectral response of an optimized stack according to the present invention.
Figure 7:
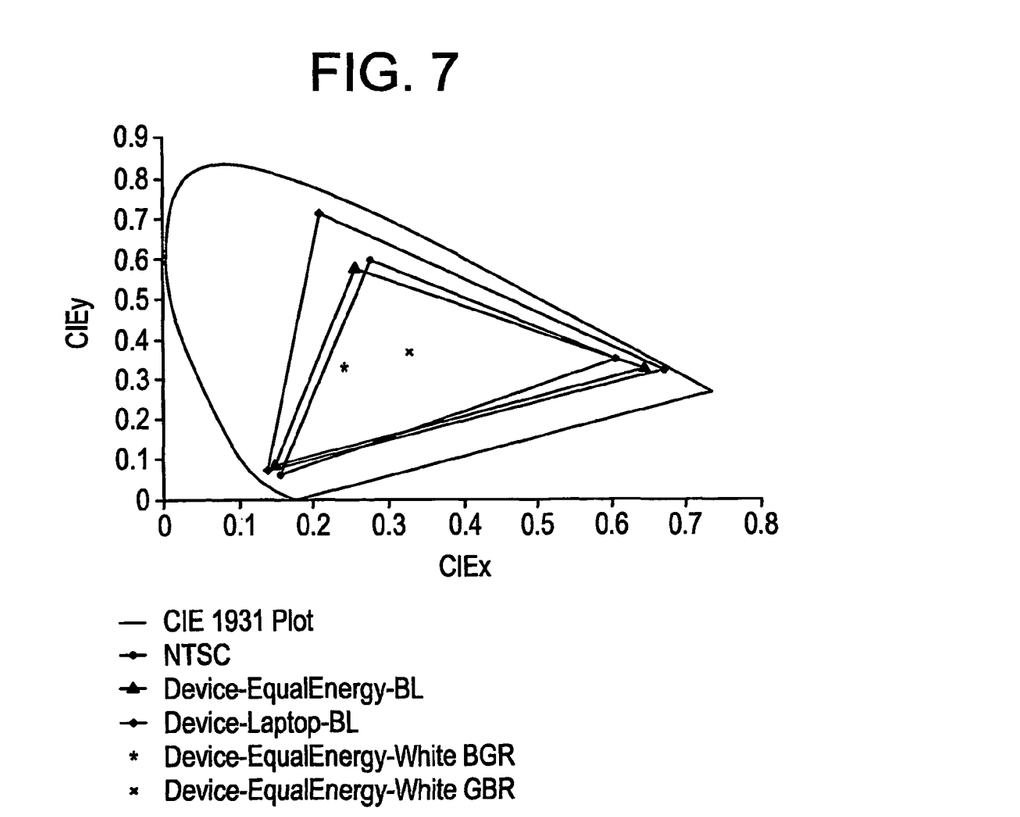
FIG. 7 shows the CIE 1931 coordinates for the optimized stack as compared to the NTSC gamut.

Using this method, the orientation and retardation of the elements making up the three different color filters were chosen. By ensuring high peak brightness at the desired wavelength along with sharp transition slopes and minimum overlap, the filter was effectively rotating the desired wavelength by pi/2, while leaving the rest of the spectra unchanged, thereby fulfilling the third condition defined above. The spectral response of the three filters put together to form a complete stack is shown, in FIG. 6, along with the CIE coordinates, in FIG. 7. The lower transmission of the blue and green state is due to polarizer characteristics at those wavelengths, and is not due to the filter design. The filter is transmitting the polarizer's maximum transmission at those wavelengths. The stack details are shown in Table 2 below.

TABLE 2

Configuration for DSTN based filter providing best color performance

| | GREEN | | BLUE | | RED | |
|---|---|---|---|---|---|---|
| | Retardation | Angle | Retardation | Angle | Retardation | Angle |
| DSTN | 1950 nm | 5° | 750 nm | −40° | 1150 nm | 40° |
| R1 | 700 nm | −40° | 600 nm | 14.5° | 500 nm | −10.5° |
| R2 | 500 nm | −70° | 800 nm | −14° | 800 nm | 13.5° |
| R3 | 500 nm | 20° | 800 nm | 76° | 800 nm | −76.5° |
| R4 | 700 nm | 50° | 600 nm | −75.5° | 500 nm | 79.5° |

Figure 8:
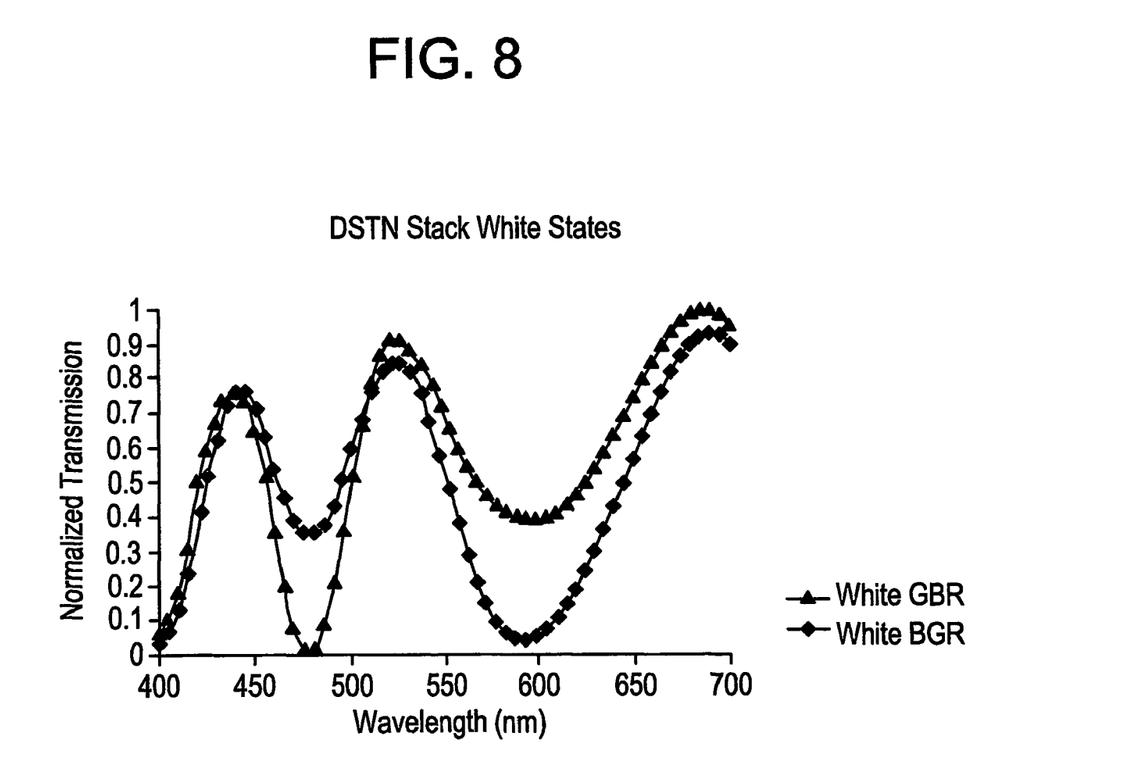
FIG. 8 shows a white state spectra for two different filter positions, GBR and BGR, in the stack.

Since the optimization was done using single color filters, and some colors, such as green, have a inherently wider passband, the position of that filter in the overall stack has an effect on the white state. The white state is where all three filters are rotating their desired wavelengths. The stack was modeled by placing the optimized filters in various positions in the stack, i.e., BGR, GBR, GRB, RBG etc., with the leftmost stack positioned immediately adjacent the polarizer, and the rightmost stack positioned immediately adjacent the analyzer. From this, it was ascertained what positioning is best. In the example being carried out, the GBR position was the best. In all the different positions the spectral response of the single color state and black state were similar. The white state was the only one that changed due to different positioning. This was due to the green cells relatively broader passband rotating certain parts of the blue and red spectra. The spectral response of the white state only is shown for the BGR and GBR states. in FIG. 8.

In the present example, the GBR state was chosen as best because it has a dip in the blue part of the spectrum (as compared to the BGR orientation which has a dip in the red). Since most backlights are red lacking, it was decided to use the GBR orientation so as to maximize red throughput in the white state. The BGR and GBR white points are shown in CIE diagram FIG. 6 and the lowered red transmission of the BGR configuration is visible in terms of a shift in the white point to the left. The GBR white point is more centered.

Thus, disclosed above is the optimization of a full color liquid crystal display of passive matrix design, wherein the passive matrix addressed optical element employed is a first twisted LC cell and a second twisted LC cell driven at the same non-select voltage as the first twisted LC cell and placed orthogonally to the first twisted LC cell. The second twisted LC cell is considered a compensator. When the compensator is chosen as a birefringence film composite, the compensator would be constructed, through known techniques, to mock the characteristics of a second twisted LC cell compensator, were one to be employed. Thus, in a birefringence film compensator, the film compensator is constructed to be a substantial mirror image of a twisted LC cell driven at the same non select voltage as the first twisted LC cell and placed orthogonally to the first twisted LC cell. Computer modeling would be employed, as above, to optimize all parameters of a full color liquid crystal display employing a passive matrix addressed optical element of a first twisted LC cell and a birefringence film composite compensator.

Therefore, after an exhaustive hunt, using computer modeling, it has been shown that a PIF filter, with characteristics similar to the device of Sharp, can be obtained using a liquid crystal device with a twisted structure. The device of this invention are characterized, in part, by using a compensator that cancels the effect of the twisted liquid crystal on the polarization state of light, when the device is in a defined state; and that allows light of the uncontrolled spectral component to be unaffected by the state of the electro-optical device.

In light of the foregoing, it should thus be evident that the process of the present invention, providing a birefringent filter-based color generation scheme for a passive matrix display device, substantially improves the art. While, in accordance with the patent statutes, only the preferred embodiments of the present invention have been described in detail hereinabove, the present invention is not to be limited thereto or thereby. Rather, the scope of the invention shall include all modifications and variations that fall within the scope of the attached claims.

What is claimed is:

1. A color liquid crystal display of passive matrix design comprising:
    a polarizer;
    an analyzer having a transmission axis; and
    at least one light generation stage positioned between said polarizer and said analyzer for transmitting light of controlled wavelengths to the analyzer, the light generation stage including:
        a first retarder stack that rotates controlled wavelengths of light to a particular polarization state,
        a second retarder stack inverted and rotated by about 90 degrees with respect to said first retarder stack, and
        a passive matrix addressed optical element including a first twisted liquid crystal cell and a compensator, said element positioned between said first and second retarder stacks, said compensator being selected from the group consisting of (a) a second twisted liquid crystal cell, fixed in one of the states of said first twisted liquid crystal cell and having an opposite twist sense, and (b) a birefringent film composite constructed to cancel the optical effect of said first twisted liquid crystal cell in one of its states, wherein said compensator ideally cancels the optical effect of said first twisted liquid crystal cell when said first twisted liquid crystal cell is in a first state, and wherein said compensator does not cancel the optical effect of said first twisted liquid crystal cell when said first twisted liquid crystal cell is not in said first state, and the retardation and orientation of said first retarder stack, said second retarder stack, and said first twisted liquid crystal cell are optimized so as to provide a color generation stage that, according to the state that said first twisted liquid crystal cell is in, selectively causes said controlled wavelengths of light to be polarized along the transmission axis of said analyzer, while not affecting the polarization state of uncontrolled wavelengths.

2. The color liquid crystal display of claim 1, wherein said passive matrix addressed optical element is a double layer super twisted nematic cell.

3. The color liquid crystal display of claim 1, wherein said first twisted liquid crystal cell is chosen to have a twist anywhere between about 180° to about 220°.

4. The color liquid crystal display of claim 1, wherein said at least one light generation stage is a stage selected from the group consisting of a red light generation stage, a green light generation stage, and a blue light generation stage.

5. The color liquid crystal display of claim 4, wherein a red light generation stage, a green light generation stage, and a blue light generation stage, each said stage controlling a corresponding range of wavelengths of light, are positioned adjacent one another between said polarizer and said analyzer.

6. The color liquid crystal display of claim 4, wherein a green light generation stage is positioned immediately adjacent said polarizer; a blue light generation stage is positioned adjacent said green light generation stage, opposite said polarizer; and a red light generation stage is positioned between said blue light generation stage and said analyzer.

7. The color liquid crystal display of claim 4, wherein a blue light generation stage is positioned immediately adjacent said polarizer; a green light generation stage is positioned adjacent said blue light generation stage, opposite said polarizer; and a red light generation stage is positioned between said green light generation stage and said analyzer.

8. The color liquid crystal display of claim 1, wherein said compensator is a second twisted liquid crystal cell, fixed in one of the states of said first twisted liquid crystal cell and having an opposite twist sense.

9. The color liquid crystal display of claim 2, wherein said compensator is a birefringent film composite constructed to mock the optical characteristics of a second twisted liquid crystal cell having the same state as one of the states of the first twisted liquid crystal cell but with an opposite twist sense.

10. A full color liquid crystal display of passive matrix design comprising:
   a polarizer;
   an analyzer having a transmission axis;
   a red light generation stage including a first red stage retarder stack that rotates red wavelengths of light to a particular polarization state, a second red stage retarder stack inverted and rotated by 90° with respect to the first red stage retarder stack, and a red stage passive matrix addressed optical element positioned between said first and second red stage retarder stacks, wherein the retardation and orientation of each of said first red stage retarder stack, said second red stage retarder stack, and said red stage passive matrix addressed optical element are optimized so as to provide a red light generation stage that places red light wavelengths substantially along the transmission axis of said analyzer while having no effect on the other wavelengths of light passing therethrough;
   a green light generation stage including a first green stage retarder stack that rotates green wavelengths of light to a particular polarization state, a second green stage retarder stack inverted and rotated by 90° with respect to said first green stage retarder stack, and a green stage passive matrix addressed optical element positioned between said first and second green stage retarder stacks, wherein the retardation and orientation of each of said first green stage retarder stack, said second green stage retarder stack, and said green stage passive matrix addressed optical element are optimized so as to provide a green light generation stage that places green light wavelengths substantially along the transmission axis of the analyzer while having no effect on the other wavelengths of light passing therethrough; and
   a blue light generation stage including a first blue stage retarder stack that rotates blue wavelengths of light to a particular polarization state, a second blue stage retarder stack inverted and rotated by 90° with respect to said first blue stage retarder stack, and a blue stage passive matrix addressed optical element positioned between said first and second blue stage retarder stacks, wherein the retardation and orientation of each of said first blue stage retarder stack, said second blue stage retarder stack, and said blue stage passive matrix addressed optical element are optimized so as to provide a blue light generation stage that places blue light wavelengths substantially along the transmission axis of the analyzer while having no effect on the other wavelengths of light passing therethrough;
   wherein each of said blue stage passive matrix addressed optical element, said green stage passive matrix addressed optical element, and said red stage passive matrix optical element include a first twisted liquid crystal cell and a compensator.

11. The full color liquid crystal display according to claim 10, wherein said compensator in each of said blue stage passive matrix addressed optical element, said green stage passive matrix addressed optical element, and said red stage passive matrix optical element is selected from the group consisting of (a) a second twisted liquid crystal cell fixed in one of the states of said first twisted liquid crystal cell of said respective stage and having an opposite twist sense and (b) a birefringent film composite constructed to cancel the optical effect of said first twisted liquid crystal cell of said respective stage in one of its states.

12. The full color liquid crystal display of claim 10, wherein each of the red stage, green stage, and blue stage passive matrix addressed optical elements is a double layer super twisted nematic cell.

13. The full color liquid crystal display of claim 10, wherein each said first twisted liquid crystal cell is chosen to have a twist anywhere between about 180° to about 220°.

* * * * *